(12) United States Patent
Tuli et al.

(10) Patent No.: US 10,559,979 B2
(45) Date of Patent: Feb. 11, 2020

(54) CHARGING RECHARGEABLE APPARATUS

(71) Applicant: Nokia Technologies Oy, Espoo (FI)

(72) Inventors: Apaar Tuli, Helsinki (FI); Anna-Leena Hartojoki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 453 days.

(21) Appl. No.: 14/898,837

(22) PCT Filed: Jun. 18, 2014

(86) PCT No.: PCT/FI2014/050481
§ 371 (c)(1),
(2) Date: Dec. 16, 2015

(87) PCT Pub. No.: WO2014/202831
PCT Pub. Date: Dec. 24, 2014

(65) Prior Publication Data
US 2016/0134152 A1  May 12, 2016

(30) Foreign Application Priority Data

Jun. 20, 2013 (GB) .................................. 1311028.3

(51) Int. Cl.
*H02J 50/12* (2016.01)
*H02J 50/80* (2016.01)
(Continued)

(52) U.S. Cl.
CPC ............ *H02J 50/12* (2016.02); *H02J 7/0047* (2013.01); *H02J 7/025* (2013.01); *H02J 7/04* (2013.01); *H02J 50/80* (2016.02)

(58) Field of Classification Search
CPC .... H02J 50/12; H02J 50/80; H02J 7/04; H02J 7/0047; H02J 7/025; H02J 7/0027; H02J 7/027; H02J 5/005
(Continued)

(56) References Cited

U.S. PATENT DOCUMENTS 5,157,319 A * 10/1992 Klontz ................ B60L 11/1816
  320/108
5,179,335 A *  1/1993 Nor ....................... H02J 7/0085
  320/159
(Continued)

FOREIGN PATENT DOCUMENTS

EP       2660944      6/2013
WO    2012090613    11/2011
(Continued)

OTHER PUBLICATIONS

Search Report received for corresponding GB Application No. 1311028.3, dated Dec. 12, 2013, 4 pages.
(Continued)

Primary Examiner — Robert Grant
Assistant Examiner — John T Trischler
(74) Attorney, Agent, or Firm — Alston & Bird LLP

(57) ABSTRACT

An apparatus comprising: control circuitry configured to switch the apparatus between a charging state in which energy transfer from the apparatus to a rechargeable apparatus is enabled and a non-charging state in which energy transfer from the apparatus to the rechargeable apparatus is not enabled; charging circuitry configured to transfer energy, when the apparatus is in the charging state, to the rechargeable apparatus for storage at the rechargeable apparatus; and indication circuitry configured to enable an indication, when the apparatus is in the non-charging state, to prompt user action to bring the rechargeable apparatus towards the apparatus for charging.

20 Claims, 7 Drawing Sheets

(51) Int. Cl.
*H02J 7/02* (2016.01)
*H02J 7/00* (2006.01)
*H02J 7/04* (2006.01)

(58) Field of Classification Search
USPC .................................................. 320/108
See application file for complete search history.

(56) References Cited

U.S. PATENT DOCUMENTS

| | | | | |
|---|---|---|---|---|
| 5,341,083 A * | 8/1994 | Klontz | ............... | B60L 11/1816 320/109 |
| 5,352,982 A * | 10/1994 | Nakazawa | ........... | G01R 31/361 320/136 |
| 5,459,671 A * | 10/1995 | Duley | ............... | G01R 31/3648 320/DIG. 21 |
| 5,462,439 A * | 10/1995 | Keith | ............... | B60L 1/08 180/279 |
| 5,487,002 A * | 1/1996 | Diller | ............... | B60L 1/003 320/128 |
| 5,565,755 A * | 10/1996 | Keith | ............... | B60L 1/08 219/202 |
| 5,572,109 A * | 11/1996 | Keith | ............... | B60L 1/08 180/279 |
| 5,598,084 A * | 1/1997 | Keith | ............... | B60L 1/08 235/382 |
| 5,696,367 A * | 12/1997 | Keith | ............... | B60L 1/08 235/380 |
| 5,790,976 A * | 8/1998 | Boll | ............... | B60L 3/12 180/65.8 |
| 5,821,731 A * | 10/1998 | Kuki | ............... | B60L 11/1805 320/108 |
| 5,908,453 A * | 6/1999 | Tabata | ............... | B60L 3/00 701/22 |
| 5,986,433 A * | 11/1999 | Peele | ............... | H02J 7/0036 320/125 |
| 6,157,162 A * | 12/2000 | Hayashi | ............... | B60L 11/1818 320/104 |
| 6,194,854 B1 * | 2/2001 | Uchibori | ............... | B60L 11/1816 318/139 |
| 6,226,536 B1 * | 5/2001 | Miyashita | ............... | H02J 7/0047 455/425 |
| 6,269,336 B1 * | 7/2001 | Ladd | ............... | H04M 3/42204 379/88.13 |
| 6,385,583 B1 * | 5/2002 | Ladd | ............... | H04M 3/4938 379/88.01 |
| 6,470,317 B1 * | 10/2002 | Ladd | ............... | H04M 3/4938 379/88.01 |
| 6,493,671 B1 * | 12/2002 | Ladd | ............... | H04M 3/4938 704/270 |
| 6,493,673 B1 * | 12/2002 | Ladd | ............... | H04M 3/42204 379/88.01 |
| 6,528,969 B2 * | 3/2003 | Tung | ............... | H02J 7/0063 320/103 |
| 6,539,359 B1 * | 3/2003 | Ladd | ............... | H04M 3/4938 379/88.01 |
| 6,668,046 B1 * | 12/2003 | Albal | ............... | H04M 15/00 379/114.01 |
| 6,668,179 B2 * | 12/2003 | Jiang | ............... | H04W 52/0277 455/572 |
| 6,700,962 B1 * | 3/2004 | Albal | ............... | G06Q 10/107 379/114.26 |
| 6,711,246 B1 * | 3/2004 | Albal | ............... | G06Q 10/107 340/7.43 |
| 6,725,256 B1 * | 4/2004 | Albal | ............... | G06Q 10/107 370/234 |
| 6,751,296 B1 * | 6/2004 | Albal | ............... | G06Q 10/107 379/121.05 |
| 6,897,785 B2 * | 5/2005 | Corbus | ............... | G08B 5/36 320/115 |
| 6,941,197 B1 * | 9/2005 | Murakami | ............... | B60L 11/1816 320/109 |
| 7,274,169 B2 * | 9/2007 | Burgan | ............... | B60R 11/02 320/107 |
| 7,274,931 B2 * | 9/2007 | Harris | ............... | H04M 1/04 348/14.02 |
| 7,443,057 B2 * | 10/2008 | Nunally | ............... | H02J 7/025 307/149 |
| 7,761,307 B2 * | 7/2010 | Ochi | ............... | G06Q 40/00 705/1.1 |
| 7,849,944 B2 * | 12/2010 | DeVault | ............... | B60K 6/365 180/65.265 |
| 7,986,126 B1 * | 7/2011 | Bucci | ............... | B60L 3/12 320/109 |
| 7,996,238 B2 * | 8/2011 | Ochi | ............... | G06Q 40/00 705/1.1 |
| 7,999,506 B1 * | 8/2011 | Hollar | ............... | B60L 11/1818 320/104 |
| 8,024,012 B2 * | 9/2011 | Clevenger | ............... | H02J 17/00 455/572 |
| 8,090,415 B2 * | 1/2012 | Annambhotla | .... | G01R 31/3648 455/573 |
| 8,094,140 B2 * | 1/2012 | Katsurahira | ........ | G06F 3/03545 178/19.01 |
| 8,111,044 B2 * | 2/2012 | Griffin, Jr. | ............ | H02J 7/0042 320/107 |
| 8,143,850 B2 * | 3/2012 | Erickson | ............... | H02J 7/0027 320/115 |
| 8,155,710 B2 * | 4/2012 | Harris | ............... | H04M 1/04 455/127.1 |
| 8,174,233 B2 * | 5/2012 | Julstrom | ............... | H02J 7/025 320/108 |
| 8,174,234 B2 * | 5/2012 | Julstrom | ............... | H02J 7/025 320/108 |
| 8,198,858 B2 * | 6/2012 | Kim | ............... | H02J 7/0047 320/108 |
| 8,237,402 B2 * | 8/2012 | Julstrom | ............... | H01F 38/14 320/108 |
| 8,299,752 B2 * | 10/2012 | Sekita | ............... | H02J 7/025 320/108 |
| 8,310,205 B1 * | 11/2012 | Hamburgen | ........... | H02J 7/0073 320/107 |
| 8,330,414 B2 * | 12/2012 | Takahashi | ............... | H01M 10/44 320/108 |
| 8,354,913 B2 * | 1/2013 | Solomon | ............... | G06F 21/31 320/108 |
| 8,373,386 B2 * | 2/2013 | Baarman | ............... | H02J 5/005 320/108 |
| 8,373,683 B2 * | 2/2013 | Katsurahira | ........ | G06F 3/03545 178/19.01 |
| 8,421,402 B2 * | 4/2013 | Jang | ............... | H01M 10/465 320/101 |
| 8,423,306 B2 * | 4/2013 | Duncan | ............... | G01R 31/3648 702/63 |
| 8,432,293 B2 * | 4/2013 | Symons | ............... | H02J 7/025 340/854.8 |
| 8,452,505 B2 * | 5/2013 | Mizuno | ............... | B60K 35/00 180/65.1 |
| 8,483,899 B2 * | 7/2013 | Martin | ............... | B62D 15/028 701/22 |
| 8,574,079 B2 * | 11/2013 | Russell | ............... | G07F 17/32 463/25 |
| 8,578,439 B1 * | 11/2013 | Mathias | ............... | H04N 5/44582 725/141 |
| 8,624,719 B2 * | 1/2014 | Klose | ............... | B60L 11/1838 340/425.5 |
| 8,635,269 B2 * | 1/2014 | LaFrance | ............... | B60L 53/665 709/203 |
| 8,680,811 B2 * | 3/2014 | Mochida | ............... | H01M 10/425 320/108 |
| 8,710,796 B2 * | 4/2014 | Muller | ............... | B60L 11/1816 320/109 |
| 8,723,642 B2 * | 5/2014 | Park | ............... | G07F 15/006 340/5.8 |
| 8,736,228 B1 * | 5/2014 | Freed | ............... | H02J 7/0044 320/115 |
| 8,744,098 B2 * | 6/2014 | Rothkopf | ............... | H02J 7/00 320/108 |

(56) References Cited

U.S. PATENT DOCUMENTS

| | | | | |
|---|---|---|---|---|
| 8,760,114 B2* | 6/2014 | Sekita | H02J 7/025 | 320/108 |
| 8,805,530 B2* | 8/2014 | John | A61N 1/3785 | 607/61 |
| 8,810,195 B2* | 8/2014 | Mochida | G06K 19/0701 | 320/108 |
| 8,841,881 B2* | 9/2014 | Failing | B60L 3/00 | 320/109 |
| 8,860,366 B2* | 10/2014 | Muller | B60L 11/1816 | 180/65.1 |
| 8,880,337 B2* | 11/2014 | Scholl | G08G 1/0962 | 701/426 |
| 8,890,473 B2* | 11/2014 | Muller | B60L 3/04 | 320/109 |
| 8,890,475 B1* | 11/2014 | Becker | B60L 11/1827 | 180/65.29 |
| 8,922,329 B2* | 12/2014 | Davis | H02J 7/025 | 340/3.1 |
| 9,013,206 B2* | 4/2015 | Muller | G01R 31/40 | 324/764.01 |
| 9,024,744 B2* | 5/2015 | Klose | B60L 11/1838 | 340/425.5 |
| 9,050,900 B2* | 6/2015 | Kai | H01M 10/44 | |
| 9,056,553 B2* | 6/2015 | Cun | B60W 20/00 | 700/94 |
| 9,070,273 B2* | 6/2015 | Lombardi | G08B 21/182 | |
| 9,089,717 B2* | 7/2015 | Forsell | A61B 34/20 | |
| 9,121,073 B2* | 9/2015 | Miller | C12R 1/225 | |
| 9,134,380 B2* | 9/2015 | Duncan | G01R 31/3648 | |
| 9,153,135 B2* | 10/2015 | Bantz | G08G 1/096741 | |
| 9,160,182 B2* | 10/2015 | Keating | H02J 7/025 | |
| 9,160,200 B2* | 10/2015 | Bi | H02J 7/0047 | |
| 9,199,547 B2* | 12/2015 | Kai | H01M 10/44 | |
| 9,207,283 B2* | 12/2015 | Partee | G01R 31/36 | |
| 9,225,534 B2* | 12/2015 | Billingsley | H04L 12/12 | |
| 9,227,626 B2* | 1/2016 | Pandit | B60K 1/00 | |
| 9,270,123 B2* | 2/2016 | Teramoto | H02J 50/80 | |
| 9,290,104 B2* | 3/2016 | Gadh | B60L 11/1838 | |
| 9,301,259 B2* | 3/2016 | Tuli | H04B 1/3883 | |
| 9,312,728 B2* | 4/2016 | Baarman | H02J 5/005 | |
| 9,318,905 B2* | 4/2016 | Tsang | H02J 50/30 | |
| 9,371,007 B1* | 6/2016 | Penilla | B60L 11/1848 | |
| 9,397,518 B1* | 7/2016 | Theobald | H02J 7/025 | |
| 9,409,013 B2* | 8/2016 | Mashiach | A61N 1/0551 | |
| 9,415,215 B2* | 8/2016 | Mashiach | A61N 1/36003 | |
| 9,415,216 B2* | 8/2016 | Mashiach | A61N 1/36003 | |
| 9,436,478 B2* | 9/2016 | Lee | H04M 1/72522 | |
| 9,444,279 B1* | 9/2016 | Brown | H02J 7/0047 | |
| 9,444,282 B2* | 9/2016 | Won | H02J 7/0054 | |
| 9,446,675 B2* | 9/2016 | Konno | B60L 3/0069 | |
| 9,461,498 B2* | 10/2016 | Son | H02J 7/025 | |
| 9,491,705 B2* | 11/2016 | Skipper | H04W 52/0245 | |
| 9,509,358 B1* | 11/2016 | Shaffer | H04B 1/3888 | |
| 9,531,208 B2* | 12/2016 | Haseltine | H02J 7/025 | |
| 9,564,773 B2* | 2/2017 | Pogorelik | H02J 7/025 | |
| 9,614,371 B1* | 4/2017 | Farkas | H02J 3/14 | |
| 9,692,250 B2* | 6/2017 | Priev | H02J 7/025 | |
| 9,693,311 B2* | 6/2017 | Cardozo | H04W 52/0258 | |
| 9,722,670 B2* | 8/2017 | Won | H02J 5/005 | |
| 9,770,993 B2* | 9/2017 | Zhao | B60L 11/1846 | |
| 9,774,208 B2* | 9/2017 | Qian | H02J 50/10 | |
| 9,815,382 B2* | 11/2017 | Penilla | B60L 11/1848 | |
| 9,837,860 B2* | 12/2017 | McCarthy | H02J 7/025 | |
| 9,876,379 B1* | 1/2018 | Leabman | H02J 7/025 | |
| 9,878,170 B2* | 1/2018 | Angara | A61N 1/3787 | |
| 9,889,756 B2* | 2/2018 | Amari | B60L 11/182 | |
| 9,919,611 B2* | 3/2018 | Kim | B60L 11/1835 | |
| 9,931,954 B2* | 4/2018 | Sankaran | B60L 53/38 | |
| 9,939,868 B2* | 4/2018 | Shuster | H04M 1/72563 | |
| 9,943,686 B2* | 4/2018 | Mashiach | A61N 1/0551 | |
| 9,968,791 B2* | 5/2018 | Aghassian | A61N 1/3787 | |
| 9,973,038 B2* | 5/2018 | Li | H02J 7/025 | |
| 10,008,870 B2* | 6/2018 | Davison | H02J 7/0054 | |
| 10,063,107 B2* | 8/2018 | Makwinski | H02J 7/0042 | |
| 10,176,894 B2* | 1/2019 | Park | G16H 20/40 | |
| 10,230,255 B2* | 3/2019 | Barmoav | H02J 7/025 | |
| 10,230,277 B2* | 3/2019 | Son | H02J 7/025 | |
| 10,238,794 B2* | 3/2019 | Kamen | G16H 20/17 | |
| 10,312,746 B2* | 6/2019 | Chu | H02J 50/10 | |
| 2002/0006126 A1* | 1/2002 | Johnson | H04M 3/42204 | 370/356 |
| 2002/0118800 A1* | 8/2002 | Martinez | H04M 3/42161 | 379/67.1 |
| 2003/0041048 A1* | 2/2003 | Balasuriya | H04M 3/436 | |
| 2003/0189498 A1* | 10/2003 | Kakihara | G06Q 30/0284 | 340/928 |
| 2004/0153523 A1* | 8/2004 | Albal | G06Q 10/107 | 709/206 |
| 2005/0186953 A1* | 8/2005 | Harris | H04M 1/04 | 455/419 |
| 2006/0097885 A1* | 5/2006 | Sengupta | H04B 1/1607 | 340/636.1 |
| 2006/0287763 A1* | 12/2006 | Ochi | G06Q 40/00 | 700/231 |
| 2006/0290319 A1* | 12/2006 | Burgan | B60R 11/02 | 320/104 |
| 2007/0054706 A1* | 3/2007 | Liu | H02J 7/0044 | 455/573 |
| 2007/0096691 A1* | 5/2007 | Duncan | G06F 1/263 | 320/114 |
| 2007/0146351 A1* | 6/2007 | Katsurahira | G06F 3/03545 | 345/179 |
| 2007/0162169 A1* | 7/2007 | Watanuki | G11C 7/16 | 700/94 |
| 2007/0298776 A1* | 12/2007 | Arlene | H04M 1/04 | 455/419 |
| 2008/0015717 A1* | 1/2008 | Griffin, Jr. | H02J 7/0042 | 700/94 |
| 2008/0167531 A1* | 7/2008 | McDermott | A61B 5/0031 | 600/300 |
| 2009/0106137 A1* | 4/2009 | Ochi | G06Q 40/00 | 705/35 |
| 2009/0114463 A1* | 5/2009 | DeVault | B60K 6/365 | 180/65.29 |
| 2009/0146608 A1* | 6/2009 | Lee | H02J 7/025 | 320/108 |
| 2009/0156268 A1* | 6/2009 | Kim | H02J 7/0047 | 455/573 |
| 2009/0163277 A1* | 6/2009 | Russell | G07F 17/32 | 463/39 |
| 2009/0167543 A1* | 7/2009 | Bi | H02J 7/0047 | 340/636.1 |
| 2009/0312046 A1* | 12/2009 | Clevenger | H02J 17/00 | 455/522 |
| 2010/0026236 A1* | 2/2010 | Kamiyama | H02J 7/025 | 320/108 |
| 2010/0066305 A1* | 3/2010 | Takahashi | H01M 10/44 | 320/108 |
| 2010/0151918 A1* | 6/2010 | Annambhotla | G01R 31/3648 | 455/573 |
| 2010/0171461 A1* | 7/2010 | Baarman | H02J 5/005 | 320/108 |
| 2010/0292855 A1* | 11/2010 | Kintner-Meyer | B60L 1/08 | 700/291 |
| 2010/0320962 A1* | 12/2010 | Sekita | H02J 7/025 | 320/108 |
| 2010/0321288 A1* | 12/2010 | Katsurahira | G06F 3/03545 | 345/156 |
| 2011/0018679 A1* | 1/2011 | Davis | H02J 7/025 | 340/3.1 |
| 2011/0029144 A1* | 2/2011 | Muller | B60L 11/1816 | 700/293 |
| 2011/0029146 A1* | 2/2011 | Muller | B60L 11/1816 | 700/293 |
| 2011/0043327 A1* | 2/2011 | Baarman | H02J 5/005 | 340/5.8 |
| 2011/0082612 A1* | 4/2011 | Ichikawa | H02J 50/12 | 701/22 |
| 2011/0084652 A1* | 4/2011 | Julstrom | H02J 7/025 | 320/108 |

(56) References Cited

U.S. PATENT DOCUMENTS

| | | | |
|---|---|---|---|
| 2011/0084653 A1* | 4/2011 | Julstrom | H01F 38/14 320/108 |
| 2011/0084654 A1* | 4/2011 | Julstrom | H02J 7/025 320/108 |
| 2011/0144823 A1* | 6/2011 | Muller | B60L 3/04 700/297 |
| 2011/0175569 A1* | 7/2011 | Austin | B60L 11/1824 320/109 |
| 2011/0181240 A1* | 7/2011 | Baarman | B60L 11/182 320/108 |
| 2011/0184888 A1* | 7/2011 | Lee | G06Q 50/06 705/412 |
| 2011/0188677 A1* | 8/2011 | Rothkopf | H02J 7/00 381/150 |
| 2011/0193688 A1* | 8/2011 | Forsell | A61B 34/20 340/10.4 |
| 2011/0221390 A1* | 9/2011 | Won | H02J 7/0054 320/108 |
| 2011/0298422 A1* | 12/2011 | Failing | B60L 3/00 320/109 |
| 2012/0001591 A1 | 1/2012 | Fukaya | |
| 2012/0049646 A1* | 3/2012 | Teramoto | H02J 50/12 307/104 |
| 2012/0127132 A1* | 5/2012 | Katsurahira | G06F 3/03545 345/179 |
| 2012/0169483 A1* | 7/2012 | Katayama | G08C 17/00 340/12.54 |
| 2012/0176235 A1* | 7/2012 | Bantz | G08G 1/096741 340/459 |
| 2012/0206089 A1* | 8/2012 | LoBianco | G09F 13/00 320/107 |
| 2012/0249051 A1* | 10/2012 | Son | H02J 7/025 320/106 |
| 2012/0265361 A1* | 10/2012 | Billingsley | H04L 12/12 700/295 |
| 2012/0268238 A1* | 10/2012 | Park | G07F 15/006 340/5.8 |
| 2012/0309455 A1* | 12/2012 | Klose | B60L 11/1838 455/557 |
| 2012/0326860 A1* | 12/2012 | Bantz | G08G 1/096741 340/539.11 |
| 2013/0029595 A1* | 1/2013 | Widmer | H04B 5/0031 455/39 |
| 2013/0041730 A1* | 2/2013 | LoBianco | G09F 13/00 705/14.4 |
| 2013/0043837 A1* | 2/2013 | Sekita | H02J 7/025 320/108 |
| 2013/0057206 A1* | 3/2013 | Takahashi | H01M 10/44 320/108 |
| 2013/0063075 A1* | 3/2013 | Miller | C12R 1/225 320/107 |
| 2013/0076308 A1 | 3/2013 | Niskala et al. | |
| 2013/0082653 A1* | 4/2013 | Lee | H02J 7/0027 320/108 |
| 2013/0093382 A1* | 4/2013 | Harris | H04M 1/04 320/107 |
| 2013/0106364 A1* | 5/2013 | Baarman | H02J 5/005 320/137 |
| 2013/0123881 A1* | 5/2013 | Aghassian | A61N 1/3787 607/61 |
| 2013/0140900 A1* | 6/2013 | Yu | H02J 5/005 307/66 |
| 2013/0179057 A1* | 7/2013 | Fisher | B60L 11/1861 701/117 |
| 2013/0214735 A1* | 8/2013 | Kang | H02J 7/025 320/108 |
| 2013/0218458 A1* | 8/2013 | Scholl | G08G 1/0962 701/426 |
| 2013/0278212 A1* | 10/2013 | Kai | H01M 10/44 320/108 |
| 2013/0321024 A1* | 12/2013 | Muller | G01R 31/40 324/764.01 |
| 2014/0028254 A1* | 1/2014 | Shane | H02J 3/14 320/109 |
| 2014/0062401 A1* | 3/2014 | Gadh | B60L 11/1838 320/109 |
| 2014/0111152 A1* | 4/2014 | Kai | H01M 10/44 320/108 |
| 2014/0132201 A1* | 5/2014 | Tsang | H02J 50/30 320/107 |
| 2014/0159660 A1* | 6/2014 | Klose | B60L 53/68 320/109 |
| 2014/0172561 A1* | 6/2014 | Moon | G06Q 30/0255 705/14.53 |
| 2014/0217968 A1* | 8/2014 | Takahashi | H01M 10/44 320/108 |
| 2014/0247008 A1* | 9/2014 | Sekita | H02J 7/025 320/108 |
| 2014/0266008 A1* | 9/2014 | Partee | G01R 31/36 320/107 |
| 2014/0266025 A1* | 9/2014 | Jakubowski | H02J 5/005 320/108 |
| 2014/0340033 A1* | 11/2014 | Kim | H02J 7/025 320/108 |
| 2014/0347006 A1* | 11/2014 | Kim | H02J 7/025 320/108 |
| 2014/0361728 A1* | 12/2014 | Qian | H02J 50/10 320/106 |
| 2014/0364173 A1* | 12/2014 | Tuli | H04B 1/3883 455/573 |
| 2015/0022145 A1* | 1/2015 | Kim | H02J 7/025 320/108 |
| 2015/0028812 A1* | 1/2015 | Muller | B60L 11/1816 320/109 |
| 2015/0038197 A1* | 2/2015 | Skipper | H04W 52/0245 455/573 |
| 2015/0112264 A1* | 4/2015 | Kamen | G16H 20/17 604/151 |
| 2015/0120109 A1* | 4/2015 | Cun | B60W 20/00 701/22 |
| 2015/0127248 A1* | 5/2015 | Fisher | B60L 11/1861 701/414 |
| 2015/0171931 A1* | 6/2015 | Won | H02J 5/005 320/108 |
| 2015/0174415 A1* | 6/2015 | Angara | A61N 1/3787 607/46 |
| 2015/0174416 A1* | 6/2015 | Angara | H02J 7/025 607/46 |
| 2015/0177330 A1* | 6/2015 | Morris | H02J 7/025 320/106 |
| 2015/0180271 A1* | 6/2015 | Angara | A61N 1/3787 607/46 |
| 2015/0198676 A1* | 7/2015 | Min | H01F 38/14 320/114 |
| 2015/0217655 A1* | 8/2015 | Sankaran | H02J 50/90 701/22 |
| 2015/0244201 A1* | 8/2015 | Chu | H02J 7/025 320/108 |
| 2015/0244204 A1* | 8/2015 | Lee | H02J 7/0027 320/108 |
| 2015/0270734 A1* | 9/2015 | Davison | H02J 7/0054 320/103 |
| 2015/0323974 A1* | 11/2015 | Shuster | H04M 1/72563 713/320 |
| 2015/0343916 A1* | 12/2015 | Kim | B60L 11/1835 701/22 |
| 2015/0372529 A1* | 12/2015 | Lampinen | H02J 5/005 455/572 |
| 2015/0380979 A1* | 12/2015 | Fukaya | H02J 7/025 320/108 |
| 2016/0012706 A1* | 1/2016 | Bi | H02J 7/0047 340/636.1 |
| 2016/0072338 A1* | 3/2016 | Makwinski | H02J 7/0054 320/108 |
| 2016/0096028 A1* | 4/2016 | Aghassian | A61N 1/3787 607/60 |
| 2016/0118834 A1* | 4/2016 | Swope | H02J 50/12 320/108 |

(56) References Cited

U.S. PATENT DOCUMENTS

| | | | | |
|---|---|---|---|---|
| 2016/0126749 A1* | 5/2016 | Shichino | H02J 5/005 | 307/104 |
| 2016/0134142 A1* | 5/2016 | Murphy | H02J 7/0054 | 455/573 |
| 2016/0149440 A1* | 5/2016 | Staring | H02J 50/10 | 307/104 |
| 2016/0225024 A1* | 8/2016 | Baarman | H02J 5/005 | |
| 2016/0249908 A1* | 9/2016 | Shelton, IV | A61B 17/068 | 227/175.1 |
| 2016/0249909 A1* | 9/2016 | Shelton, IV | A61B 17/068 | 227/176.1 |
| 2016/0249915 A1* | 9/2016 | Beckman | A61B 17/07207 | 227/175.1 |
| 2016/0249916 A1* | 9/2016 | Shelton, IV | G06F 19/327 | 705/2 |
| 2016/0249917 A1* | 9/2016 | Beckman | A61B 17/07207 | 227/175.3 |
| 2016/0249918 A1* | 9/2016 | Shelton, IV | H02J 7/0013 | 227/175.1 |
| 2016/0259905 A1* | 9/2016 | Park | G16H 20/40 | |
| 2016/0264008 A1* | 9/2016 | Kintner-Meyer | B60L 1/08 | |
| 2016/0297316 A1* | 10/2016 | Penilla | B60L 11/1848 | |
| 2016/0344230 A1* | 11/2016 | Chan | H02J 7/007 | |
| 2016/0380470 A1* | 12/2016 | Son | H02J 7/025 | 320/106 |
| 2017/0010114 A1* | 1/2017 | Fisher | B60L 11/1861 | |
| 2017/0040815 A1* | 2/2017 | Todasco | H02J 7/0047 | |
| 2017/0331523 A1* | 11/2017 | Won | H02J 5/005 | |
| 2018/0034292 A1* | 2/2018 | Yin | G08B 21/182 | |
| 2018/0048178 A1* | 2/2018 | Leabman | H02J 50/90 | |
| 2018/0049563 A1* | 2/2018 | Henson | H02J 7/0044 | |
| 2018/0250518 A1* | 9/2018 | Aghassian | A61N 1/3787 | |
| 2019/0181674 A1* | 6/2019 | Greene | H02J 7/0047 | |

FOREIGN PATENT DOCUMENTS

| | | |
|---|---|---|
| WO | 2012165242 | 12/2012 |
| WO | 2013084488 | 6/2013 |

OTHER PUBLICATIONS

International Search Report and Written Opinion received for corresponding Patent Cooperation Treaty Application No. PCT/FI2014/050481, dated Nov. 19, 2014, 13 pages.

* cited by examiner

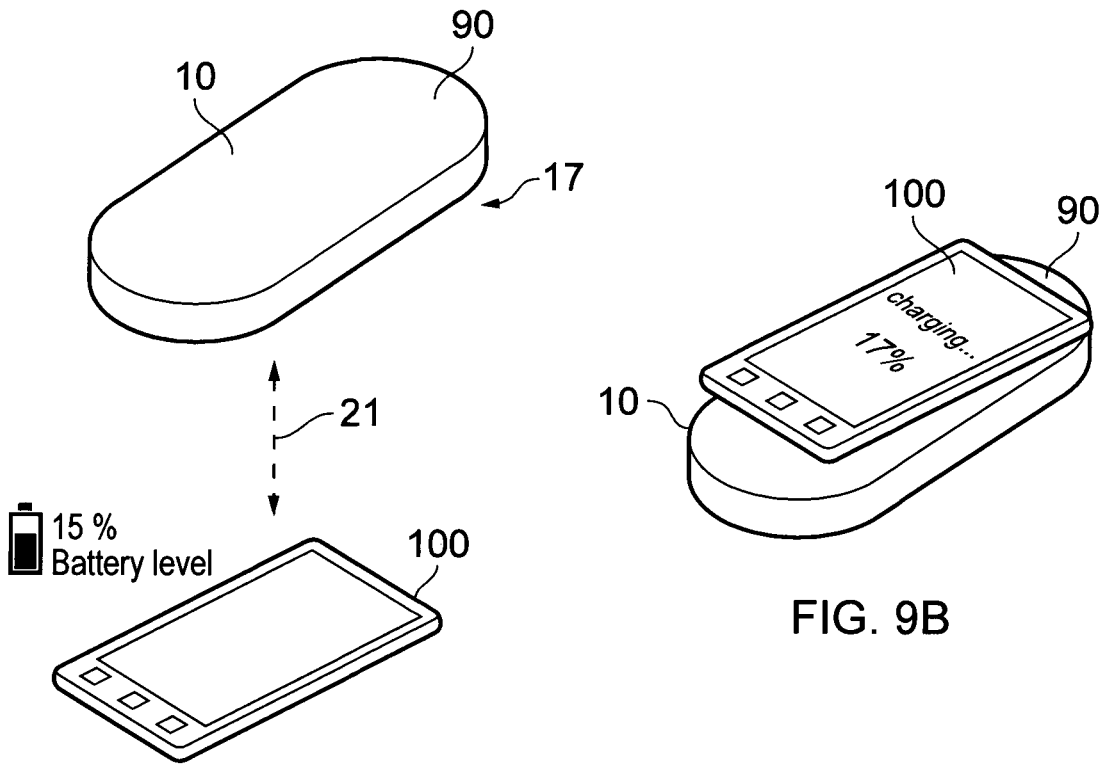
FIG. 9A
FIG. 9B
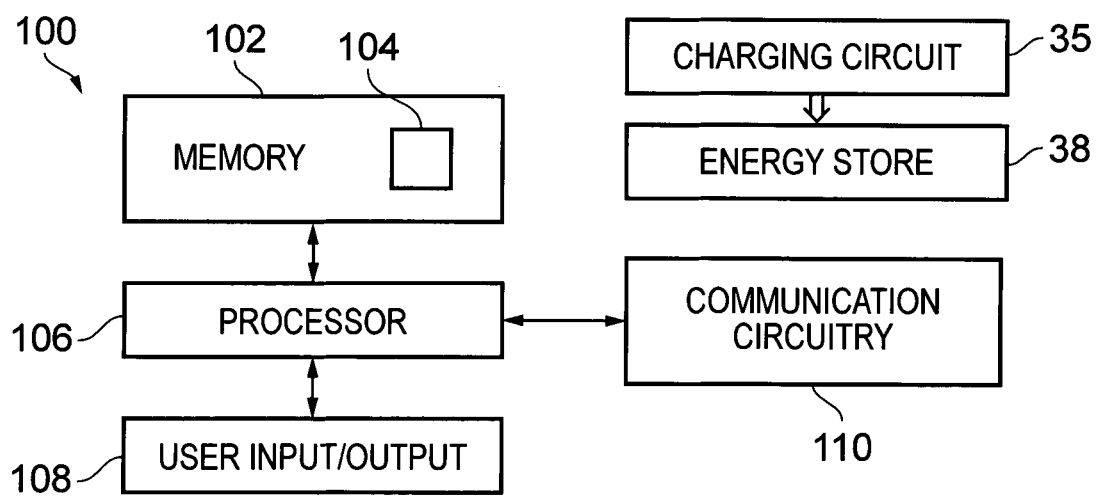
FIG. 10

CHARGING RECHARGEABLE APPARATUS

RELATED APPLICATION

This application was originally filed as PCT Application No. PCT/FI2014/050481 filed Jun. 18, 2014 which claims priority benefit from GB Patent Application No. 1311028.3, filed Jun. 20, 2013.

TECHNOLOGICAL FIELD

Embodiments of the present invention relate to charging rechargeable apparatus.

BACKGROUND

A rechargeable apparatus is an apparatus that comprises a rechargeable energy store for storing energy used for its operation. The rechargeable energy store may, for example, be a rechargeable battery cell or cells.

A charging apparatus may be used to transfer energy to the rechargeable apparatus and recharge the energy store.

BRIEF SUMMARY

According to various, but not necessarily all, embodiments of the invention there is provided an apparatus comprising: control circuitry configured to switch the apparatus between a charging state in which energy transfer from the apparatus to a rechargeable apparatus is enabled and a non-charging state in which energy transfer from the apparatus to the rechargeable apparatus is not enabled; charging circuitry configured to transfer energy, when the apparatus is in the charging state, to the rechargeable apparatus for storage at the rechargeable apparatus; and indication circuitry configured to enable an indication, when the apparatus is in the non-charging state, to prompt user action to bring the rechargeable apparatus towards the apparatus for charging.

According to various, but not necessarily all, embodiments of the invention there is provided a method comprising: enabling an indication at a charging apparatus, during a non-charging state of the charging apparatus, to prompt user action to bring a rechargeable apparatus towards the charging apparatus for charging.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: providing a user interface configured to enable a user to define a trigger event that causes, at a remote charging apparatus, an indication, when the charging apparatus is in a non-charging state, to prompt action by a user of the rechargeable apparatus to bring the rechargeable apparatus towards the charging apparatus for charging.

According to various, but not necessarily all, embodiments of the invention there is provided a method comprising: providing a user interface to enable a user to define a trigger event that causes, at a remote charging apparatus, an indication, when the charging apparatus is in a non-charging state, to prompt action by a user of the rechargeable apparatus to bring the rechargeable apparatus towards the charging apparatus for charging.

According to various, but not necessarily all, embodiments of the invention there is provided a computer program which when run on a processor of a rechargeable apparatus causes the processor to: provide a user interface configured to enable a user to define a trigger event that causes, at a remote charging apparatus, an indication, when the charging apparatus is in a non-charging state, to prompt action by a user of the rechargeable apparatus to bring the rechargeable apparatus towards the charging apparatus for charging.

According to various, but not necessarily all, embodiments of the invention there is provided an apparatus comprising: charging circuitry configured to transfer energy, when enabled, to a rechargeable apparatus within a charging range of the apparatus for storage at the rechargeable apparatus; and indication circuitry configured to provide a pre-charging indication at the apparatus at least when the rechargeable hand-portable apparatus is outside the charging range, wherein the pre-charging indication indicates that action is required by a user of the rechargeable hand-portable apparatus to move the rechargeable hand-portable apparatus within the charging range and enable charging.

According to various, but not necessarily all, embodiments of the invention there is provided an apparatus comprising: control circuitry for switching the apparatus between a charging state in which energy transfer from the apparatus to a rechargeable apparatus is enabled and a non-charging state in which energy transfer from the apparatus to the rechargeable apparatus is not enabled; charging circuitry configured to transfer energy, when the apparatus is in the charging state, to the rechargeable apparatus for storage at the rechargeable apparatus; and wireless communication circuitry configured to receive a transmitted wireless trigger signal relating to the rechargeable apparatus; and indication circuitry configured to change an indication, in response to the wireless trigger signal when the apparatus is in the non-charging state.

BRIEF DESCRIPTION

For a better understanding of various examples that are useful for understanding the brief description, reference will now be made by way of example only to the accompanying drawings in which:

FIGS. 9A and 9B illustrate a system comprising a charging apparatus and one or more rechargeable apparatus;

FIG. 10 illustrates an example of a rechargeable apparatus; and

DETAILED DESCRIPTION

Figure 1:
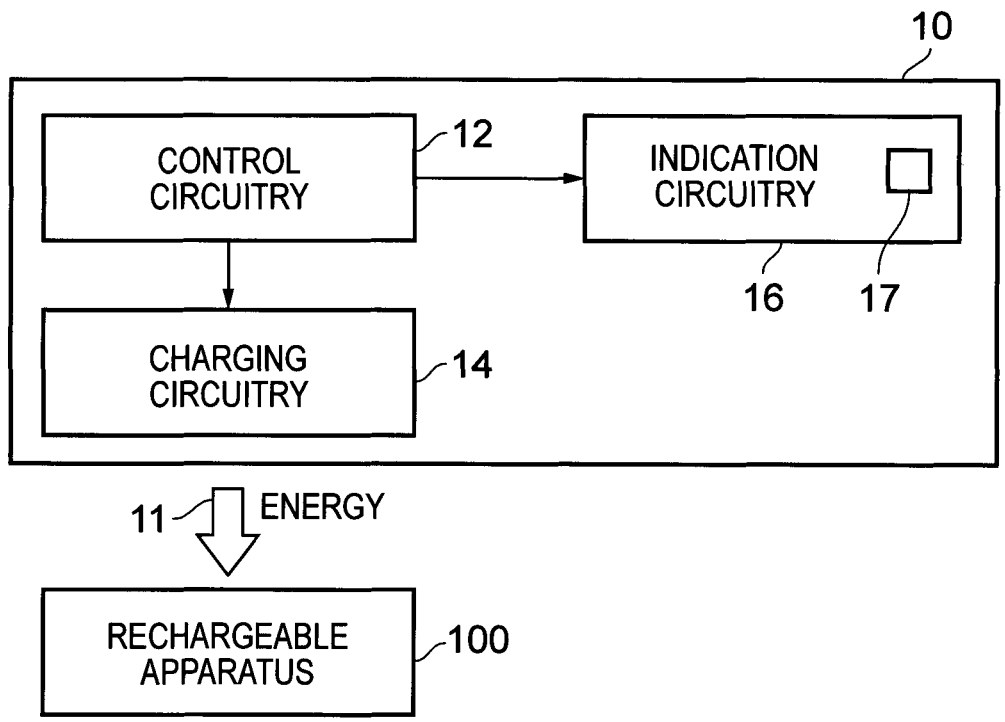
FIG. 1 illustrates an example of a charging apparatus.

FIG. 1 illustrates an example of an apparatus 10. The apparatus 10 is a charging apparatus which is used for charging a rechargeable apparatus 100 by transferring energy 11 from the apparatus 10 to the rechargeable apparatus 10.

The apparatus 10 comprises control circuitry 12. The control circuitry 12 is configured to switch the apparatus between a charging state in which energy transfer from the apparatus 10 to the rechargeable apparatus 100 is enabled and a non-charging state in which energy transfer from the apparatus 10 to the rechargeable apparatus 100 is not enabled.

The apparatus 10 additionally comprises charging circuitry 14 configured to transfer energy 11, when the apparatus 10 is in the charging state, to the rechargeable apparatus 100 for storage at the rechargeable apparatus 100.

The apparatus 10 additionally comprises indication circuitry 16 configured to enable an indication 17, when the apparatus 10 is in the non-charging state, to prompt user action to bring the rechargeable apparatus 100 towards the apparatus 10 for charging.

Figure 2:
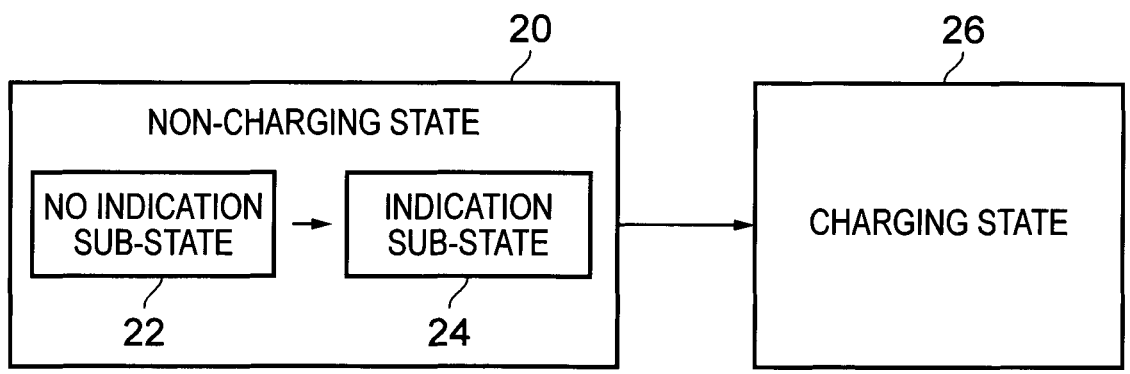
FIG. 2 illustrates an example of the states and sub-states of an example of the charging apparatus.

FIG. 2 illustrates an example of the states and sub-states of an example of the apparatus 10. The apparatus 10, when operational, may occupy a charging state 26 in which energy transfer from the apparatus 10 to the rechargeable apparatus 100 is enabled or alternatively a non-charging state 20 in which energy transfer from the apparatus 10 to the rechargeable apparatus 100 is not enabled. The control circuitry 12 is configured to switch the apparatus between the charging state 26 and the non-charging state 20.

When the apparatus 10 occupies the non-charging state 20, it may occupy either a no-indication sub-state 22 or an indication sub-state 24. In the indication sub-state 24 the indication circuitry 16 provides an indication 17 to prompt user action to bring the rechargeable apparatus 100 towards the apparatus 10 for charging. In the no-indication sub-state 22 the indication circuitry 16 does not provide an indication 17 to prompt user action to bring the rechargeable apparatus 100 towards the apparatus 10 for charging.

The control circuitry 12 or other circuitry may be configured to switch the apparatus 10 between the no-indication sub-state 22 and the indication sub-state 24. The control circuitry 12 or other circuitry may therefore be capable of controlling when, and possibly how, the indication 17 is provided.

Figure 3:
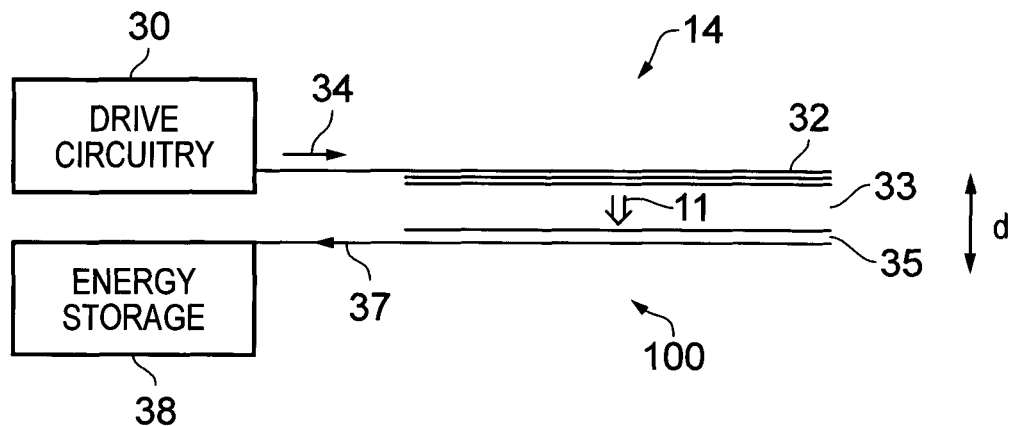
FIG. 3 illustrates in more detail an example of the charging circuitry of the charging apparatus.

FIG. 3 illustrates in more detail an example of the charging circuitry 14 of the apparatus 10 and the complimentary charging circuitry 35 of the rechargeable apparatus 100.

The charging circuitry 14 comprises wireless charging circuitry configured, when the apparatus is in the charging state 26, to transfer energy 11 wirelessly to the rechargeable apparatus 100. The transferred energy 11 is stored at the rechargeable apparatus 100 in the energy store 38, which may be a rechargeable battery cell (or cells).

In the illustrated example, but not necessarily all examples, the wireless charging circuitry 14 comprises an inductive charging system comprising at least one primary transformer coil 32 configured to operate as an electromagnetic energy source when energised by drive circuitry 30. The drive circuitry 30 provides a time-varying electric current 34 to the primary transformer coil 32. The primary transformer coil 32 consequently produces time-varying magnetic flux that extends across the gap 33 separating the apparatus 10 and the rechargeable apparatus 100. The time-varying magnetic flux inductively couples to a secondary transformer coil 35 of the rechargeable apparatus 100 inducing an electric current 37. The electric current 37 is used to store energy in the energy store 38, for example, by recharging rechargeable battery cell(s).

The charging circuitry 14 is configured to transfer energy 11 within a charging range d. When the apparatus 10 is in the charging state 26 and the rechargeable apparatus is within the charging range d, the charging circuitry 14 transfers energy 11 to the rechargeable apparatus 100 for storage at the rechargeable apparatus 100. The indication 17 provided by the indication circuitry 16 prompts the user of the rechargeable apparatus 100 to move the rechargeable apparatus 100, which is outside the charging range, towards the apparatus 10 and within the charging range for charging.

The charging circuitry 14 may be configured to transfer energy 11 automatically to the rechargeable apparatus 100 when the apparatus 10 is in the charging state 26 and the rechargeable apparatus 100 is within the charging range. The charging range may be less than 0.3 meters.

Referring back to FIG. 3, the primary transformer coil 32 is configured to operate as an electromagnetic energy source in the near-field (non-radiative). In the example where the drive circuitry 30 is configured to provide an electric current 34 that oscillates with a wavelength $\lambda$, the charging range may be of the order $\lambda$. The apparatus 10 may be configured to enable relative positioning of the rechargeable apparatus 100 and the apparatus 10 such that the secondary transformer coil 35 is within a distance $\lambda$ of the primary transformer coil 32. In the example of FIG. 9, the apparatus 10 comprises a charging pad or mat 90 on which the rechargeable apparatus 100 is placed to automatically initiate charging by the apparatus 10.

Figure 4A:
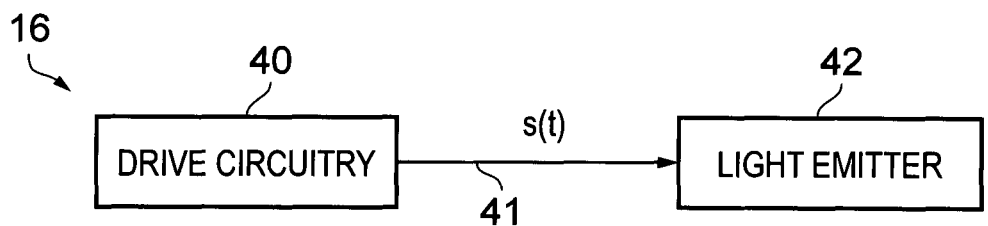
FIG. 4A illustrates one example of indication circuitry of the charging apparatus where the produced indication comprises a visual indication.

FIG. 4A illustrates one example of indication circuitry 16 where the indication 17 comprises a visual indication. In this example, the indication circuitry 16 comprises one or more light emitters 42 which produce the indication 17 and drive circuitry 40 which produces a drive signal 41 for driving the light emitter(s) 42.

The drive signal 41 may be used to enable an indication 17 that comprises emission of a constant single color of light, or emission of light according to a time and/or spatially varying intensity pattern, or emission of light according to a time and/or spatially varying color pattern, or emission of light according to a time and/or spatially varying intensity and color pattern. In some but not necessarily all examples, characteristics of the indication 17 may be programmed via the rechargeable apparatus 100.

The indication 16 is an invitation to a user of the rechargeable apparatus 100 to move the rechargeable apparatus 100 closer, within the charging range, to start charging the rechargeable apparatus 100.

The indication 17 may occur only when a trigger event occurs. The trigger event changes sub-state of the non-charging state 20 from the no-indication sub-state 22 to the indication sub-state 24. The trigger event may be determined by a user of the rechargeable apparatus 100 by specifying one or more mandatory conditions which must be satisfied. Examples of conditions comprise: charging level of the rechargeable apparatus 100 and/or location/proximity of the rechargeable apparatus 100, as described in more detail below in relation to FIG. 11.

In some but not necessarily all examples, the occurrence of the indication 17 may be made dependent upon the distance of the rechargeable apparatus 100 from the apparatus 10 using the location/proximity condition. The indication 17 can, in this scenario, serve as a reminder occurring only when the rechargeable apparatus 100 approaches close to (e.g. within 5 m) of the apparatus 10 or approaches a region in the vicinity (e.g. within 50 m) of the apparatus In some but not necessarily all examples, the occurrence of the indication 17 is not dependent upon the distance of the rechargeable apparatus 100 from the apparatus 10.

The indication 17 can, in this scenario, be provided as soon as the rechargeable apparatus 100 and the charging apparatus 10 can communicate. This may occur when the rechargeable apparatus 100 approaches within 40-100 m of the charging apparatus 10.

The indication circuitry 16 may be configured to synchronise the indication 17 with an additional indication at the rechargeable apparatus 100. The additional indication may, for example, also comprise a visual indication and/or a vibration alert and/or an audio alert.

Figure 4B:
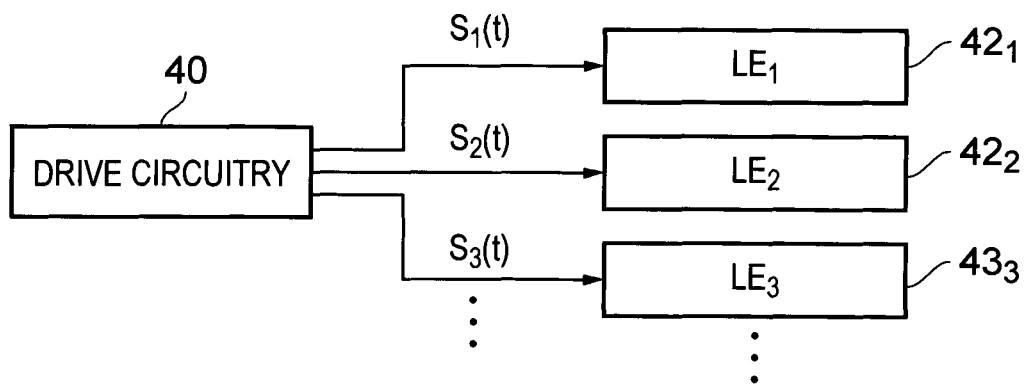
FIG. 4B illustrates one example of indication circuitry of the charging apparatus where there is a different indication for different rechargeable apparatuses.

FIG. 4B illustrates one example of indication circuitry 16 where there is a different indication 17 for different rechargeable apparatuses 100. A different indication comprises a different visual indication in this example.

In this example, the indication circuitry 16 comprises a first light emitter $42_1$ which can be controlled to produce an indication 17 when the apparatus 10 is in the non-charging state, to prompt user action to bring a first rechargeable apparatus 100 towards the apparatus 10 for charging.

In this example, the indication circuitry 16 comprises a second light emitter $42_2$ which can be controlled to produce another different indication 17 when the apparatus 10 is in the non-charging state, to prompt user action to bring a second rechargeable apparatus 100, different from the first rechargeable apparatus 100, towards the apparatus 10 for charging.

In this example, the indication circuitry 16 may comprises further light emitters $42_n$ which can be controlled to produce distinct indications 17 when the apparatus 10 is in the non-charging state, to prompt user action to bring further rechargeable apparatuses 100 towards the apparatus 10 for charging.

In this example, drive circuitry 40 produces simultaneously drive signals 41 for driving the multiple light emitters 42. The indication circuitry 16 is therefore configured to enable simultaneously plural distinct indications 17, when the apparatus is in the non-charging state, to prompt user action to bring plural rechargeable apparatuses 100 towards the apparatus 10 for charging. Each of the distinct indications 17 is associated with a particular rechargeable apparatus Different light emitters 42 produce different indications which are associated with different rechargeable apparatuses 100. Thus when an indication 17 is produced it is dependent upon an identity of the rechargeable apparatus 100 it is associated with.

In the example where the apparatus 10 operates with multiple different rechargeable apparatus 10, then the apparatus 10 may have in respect of each rechargeable apparatus 100, a non-charging state 20 and a charging state 26 and a no-indication sub-state 22 and an indication sub-state 24.

The control circuitry 12 of the apparatus 10 may be configured to switch the apparatus between a (rechargeable apparatus specific) charging state in which energy transfer is enabled and a (rechargeable apparatus specific) non-charging state in which energy transfer is not enabled. The indication circuitry 16 is configured to enable a (rechargeable apparatus specific) indication, when the apparatus 10 is in the (rechargeable apparatus specific) non-charging state, to prompt user action to bring the specific rechargeable apparatus 100 towards the apparatus 10 for charging.

Figure 5:
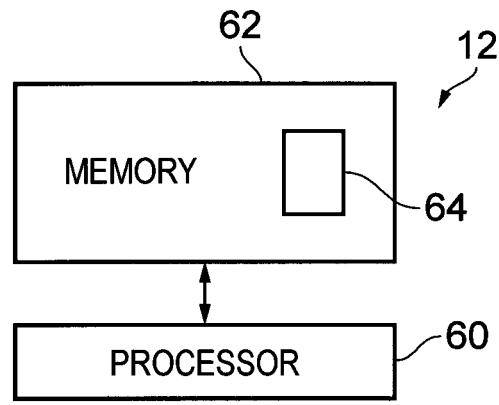
FIG. 5 illustrates an example of control circuitry of the charging apparatus.

FIG. 5 illustrates an example of control circuitry 12, although other types of control circuitry 14 are possible.

In this example, but not necessarily all examples, the control circuitry comprises a processor 60 and a memory 62. However, implementation of the control circuitry can be in hardware alone (a circuit, a processor), have certain aspects in software including firmware alone or can be a combination of hardware and software (including firmware).

The control circuitry 12 may be implemented using instructions that enable hardware functionality, for example, by using executable computer program instructions in a general-purpose or special-purpose processor that may be stored on a computer readable storage medium (disk, memory etc) to be executed by such a processor.

In FIG. 5, the processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions (computer program code) that controls the operation of the apparatus 10 when loaded into the processor 60. The computer program instructions, of the computer program 64, provide the logic and routines that enables the apparatus to perform the methods illustrated in the other Figs. The processor 60 by reading the memory 62 is able to load and execute the computer program 64.

The apparatus 10 therefore comprises: at least one processor 60; and at least one memory 64 including computer program code 64, the at least one memory 64 and the computer program code 64 configured to, with the at least one processor 60, cause the apparatus 10 at least to perform: controlling indication circuitry to enable an indication, when the apparatus 10 is in the non-charging state, to prompt user action to bring the rechargeable apparatus 100 towards the apparatus 10 for charging.

In some but not necessarily all examples, the control circuitry 12 is configured to enable the indication 17, in response to a received wireless trigger signal 21 when the apparatus is in the non-charging state 20.

The computer program 64 may arrive at the apparatus 10 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 64. The delivery mechanism may be a signal configured to reliably transfer the computer program 64. The apparatus 10 may propagate or transmit the computer program 64 as a computer data signal.

Although the memory 62 is illustrated as a single component it may be implemented as one or more separate components some or all of which may be integrated/removable and/or may provide permanent/semi-permanent/dynamic/cached storage.

Although the processor 60 is illustrated as a single component it may be implemented as one or more separate components some or all of which may be integrated/removable.

Figure 6:
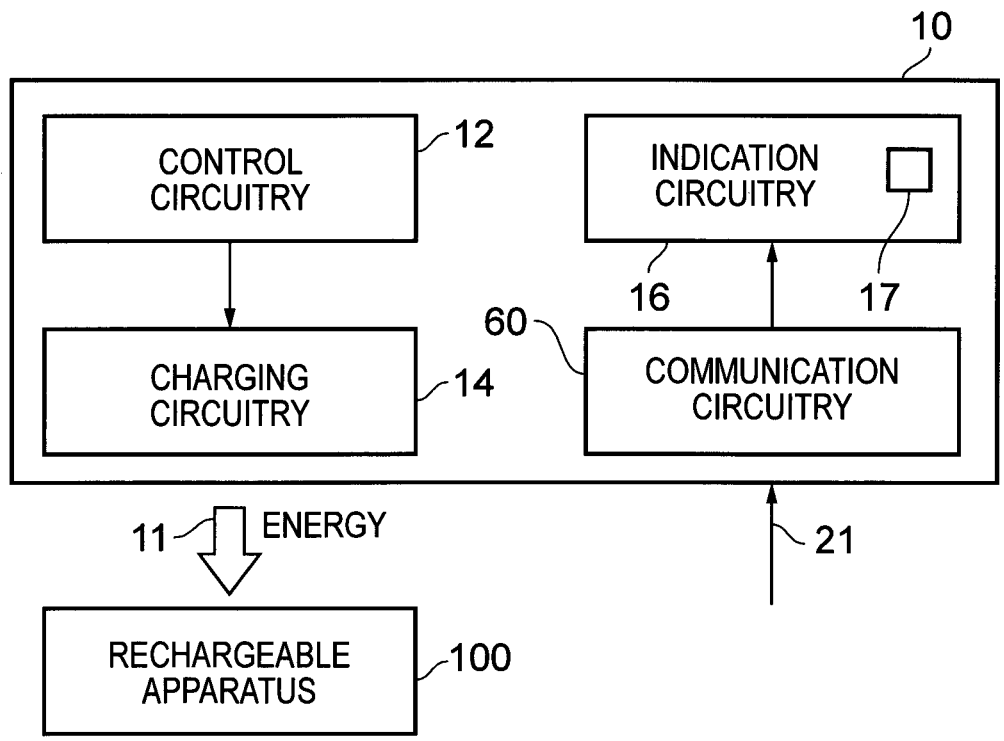
FIG. 6 illustrates another example of a charging apparatus.

FIG. 6 illustrates an example of the apparatus 10 illustrated in FIG. 1. The apparatus 10 illustrated in FIG. 6 has similar components as the apparatus 10 illustrated in FIGS. 1 and 2 to 5.

The apparatus 10 additionally comprises wireless communication circuitry 60 that is configured to receive a transmitted wireless trigger signal 21 relating to the rechargeable apparatus 100.

The indication circuitry 16 is configured to enable the indication 17, in response to the received wireless trigger signal 21 when the apparatus is in the non-charging state 20.

In the illustrated example, but not necessarily all examples, the wireless communication circuitry 60 is configured to receive the transmitted wireless trigger signal 21 as far-field, radiating radio waves.

For example, the wireless communication circuitry 60 may be configured to receive the transmitted wireless trigger signal 21 as radio signals in one or more of the unlicensed Industrial Scientific Medical (ISM) bands, for example as radio signal at an operational frequency between 2400 MHz and 2500 MHz.

It should be noted that in this example, the wireless communication circuitry 60 is distinct from the charging circuitry 14. The wireless communication circuitry 60 may in some but not necessarily all examples comprise a Bluetooth® low-energy transceiver.

In some, but not necessarily all examples, the wireless communication circuitry 60 is configured to communicate over a communication range that is greater than 0.5 meters and less than 10 m or 100 m. The wireless communication circuitry 60 is therefore able to communicate over a distance greater than the charging range but which is still local to the apparatus 10.

Figure 7A:
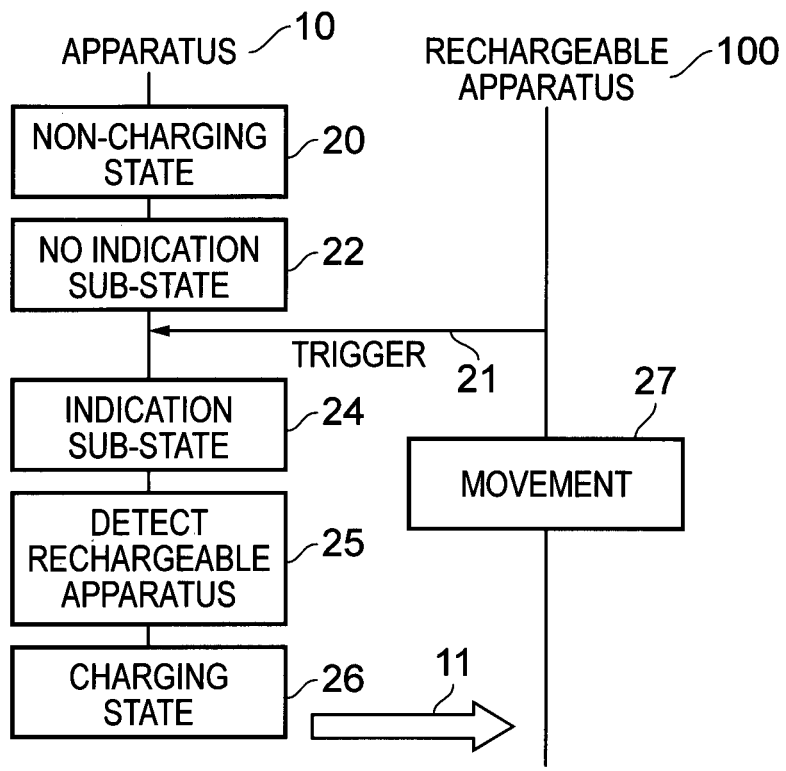
FIG. 7A illustrates a method in which a rechargeable apparatus transmits a trigger radio signal directly to a changing apparatus.

FIG. 7A illustrates a method in which a rechargeable apparatus 100 transmits a trigger radio signal 21 directly to a changing apparatus 10, such as for example that illustrated in FIG. 6.

The apparatus 10 is in a non-charging state 20 and a no-indication sub-state 22.

The rechargeable apparatus 100 transmits a trigger radio signal 21.

The apparatus 10 receives the trigger radio signal 21 at communication circuitry 60. In response to the received trigger radio signal 21, the apparatus 10 changes its sub-state from the no-indication sub-state 22 to the indication sub-state 24. As a consequence, the indication circuitry 16 of the apparatus 10 enables an indication 17 to prompt user action to bring the rechargeable apparatus 100 towards the apparatus 10 for charging. The indication circuitry 16 of the apparatus 10 continuously enables the indication 17 until the state or sub-state of the apparatus is changed.

The user moves 27 the rechargeable apparatus 100 within the charging range of the charging apparatus 10.

The apparatus 10 automatically detects the presence of the rechargeable apparatus 100 using either the communication circuitry 60 or the charging circuitry 14. In response, the apparatus 10 changes its state from the non-charging state 20 (indication sub-state 24) to the charging state 26. As a consequence, the indication circuitry 16 of the apparatus 10 no longer enables the indication 17. In the charging state 26, the apparatus 10 transfers energy 11 to the rechargeable apparatus 100 using the charging circuitry 14.

The method therefore enables an indication 17 at a charging apparatus 10, during a non-charging state 20 of the charging apparatus 10, to prompt user action 27 to bring a rechargeable apparatus 100 towards the charging apparatus 10 for charging.

Figure 7B:
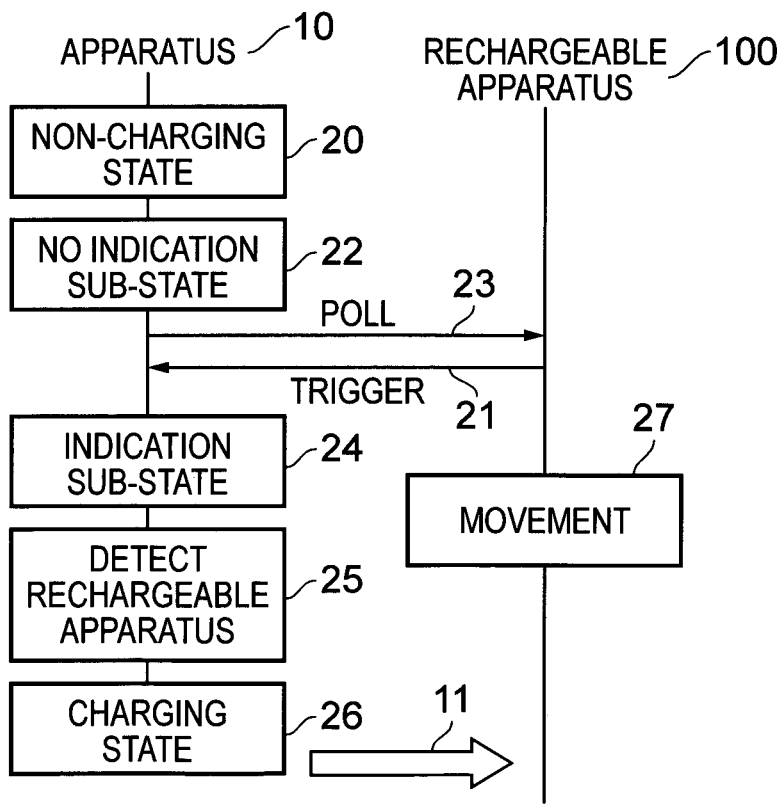
FIG. 7B illustrates a method in which a rechargeable apparatus transmits, as a reply, a trigger radio signal directly to a changing apparatus.

FIG. 7B illustrates a method similar to FIG. 7A, it differs in that the trigger radio signal 21 is transmitted in reply to a poll radio signal 23 transmitted by the charging apparatus 10 directly to the rechargeable apparatus 100. The wireless communication circuitry 60 of the apparatus 10 is configured to transmit the poll radio signal 23 that prompts the rechargeable apparatus 100 to transmit the trigger radio signal 21.

Figure 8A:
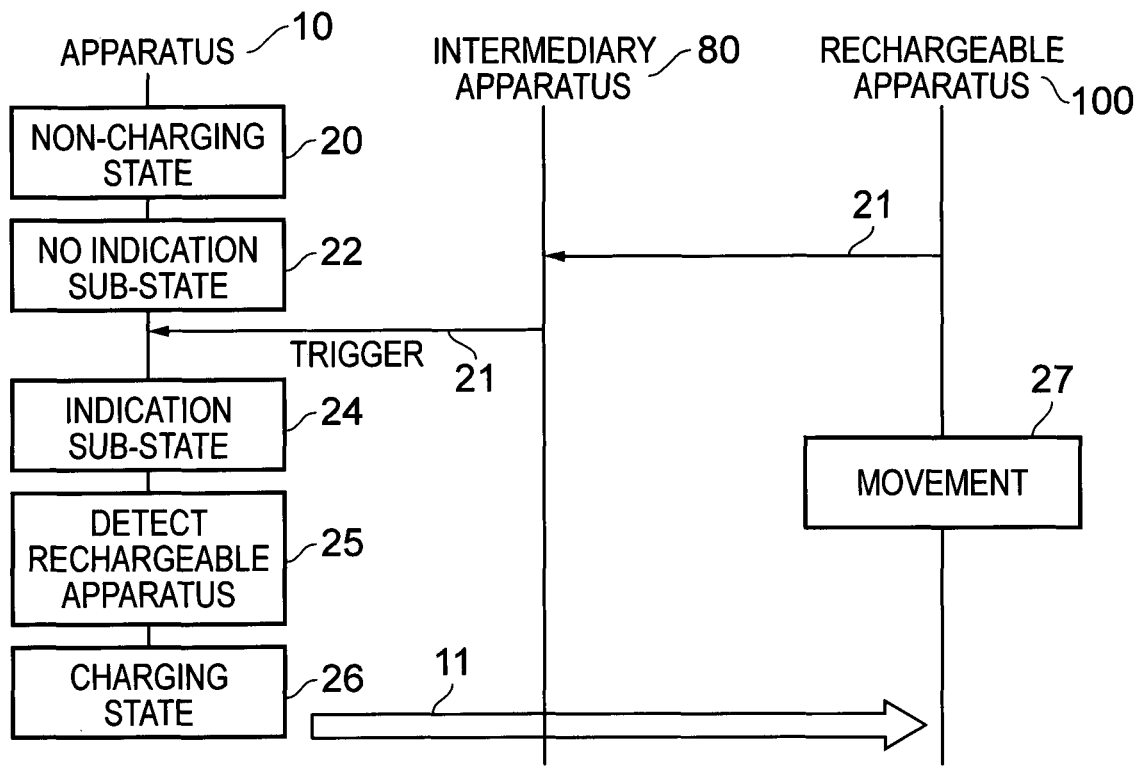
FIG. 8A illustrates a method in which a rechargeable apparatus transmits a trigger radio signal indirectly to a changing apparatus.

FIG. 8A illustrates a method similar to FIG. 7A, it differs in that the trigger radio signal 21 is transmitted indirectly to the charging apparatus 10 via an intermediary apparatus 80.

Figure 8B:
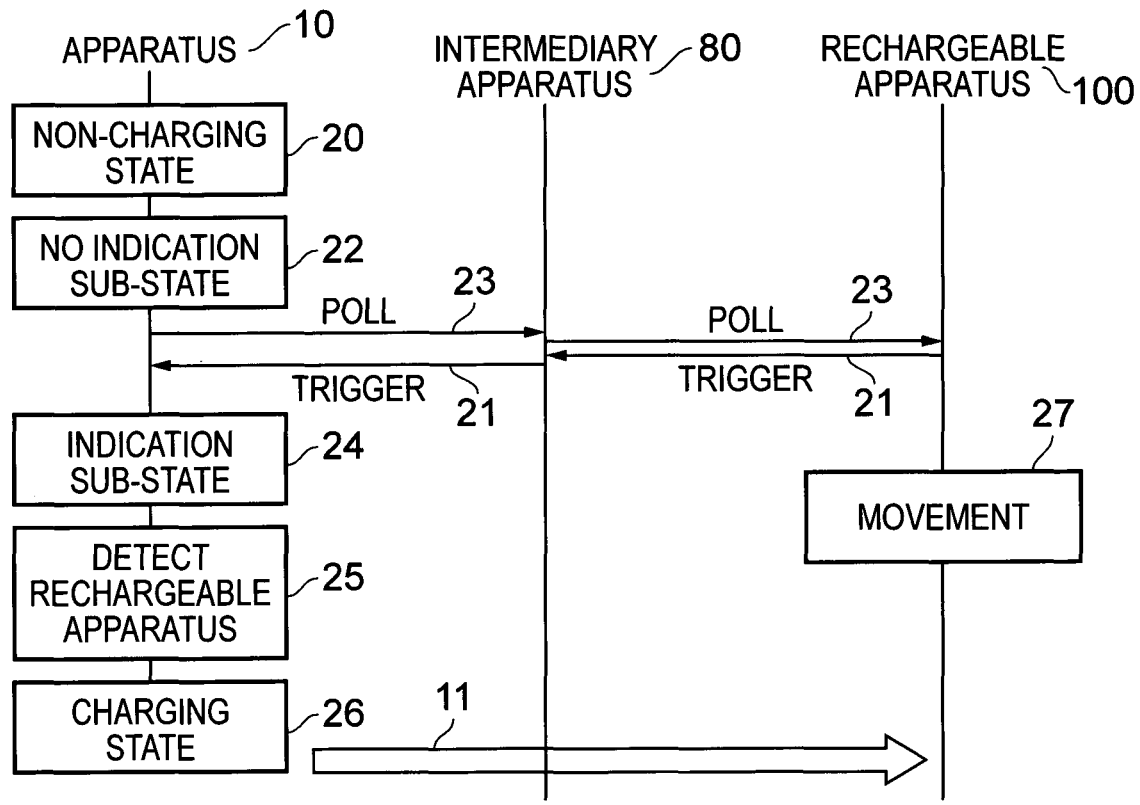
FIG. 8B illustrates a method in which a rechargeable apparatus transmits, as a reply, a trigger radio signal indirectly to a changing apparatus.

FIG. 8B illustrates a method similar to FIG. 8A, it differs in that the trigger radio signal 21 is transmitted in reply to a poll radio signal 23 transmitted by the charging apparatus 10 indirectly to the rechargeable apparatus 100 via the intermediary apparatus 80.

In FIGS. 7A and 7B, the rechargeable apparatus 100 may be any rechargeable device. In some but not necessarily all examples it may be a primary device that may be used with one or more secondary accessory devices, or it may be a secondary accessory device.

In FIGS. 8A and 8B, the rechargeable apparatus 100 may be any rechargeable device. In some but not necessarily all examples it may be a primary device that may be used with one or more secondary accessory devices, or it may be a secondary accessory device.

In FIGS. 8A and 8B, the intermediary apparatus 80 may be any rechargeable device. In some but not necessarily all examples it may be a primary device that may be used with one or more secondary accessory devices, or it may be a secondary accessory device.

Some examples of a primary device include, but are not limited to, a personal media player and a mobile cellular telephone.

Some examples of secondary accessory devices include, but are not limited to, a wireless headset and a wireless loudspeaker.

The preceding description relating to FIGS. 7A, 7B, 8A and 8B has described a change in the sub-state of the apparatus 10, in response to the received trigger radio signal 21. The apparatus 10 exits the no-indication sub-state 22 and enters the indication sub-state 24. This results in the indication 17 being enabled (switched-on). If the rechargeable apparatus 100 provides a corresponding additional indication at the rechargeable apparatus 100, then it too would be enabled (switched-on)

As will be described below, at a later time, the apparatus 10 may exit the indication sub-state 24 and disable (switch-off) the indication 17. If the rechargeable apparatus 100 provides a corresponding additional indication at the rechargeable apparatus 100, then it too would be disabled (switched-off)

As an example, the apparatus 10 may exit the indication sub-state 24 and disable (switch-off) the indication 17 when the rechargeable apparatus 100 associated with the indication 17 is being charged. In some but not necessarily all examples, apparatus 10 may exit the indication sub-state 24 when the rechargeable apparatus 100 associated with the indication 17 is brought within the charging range of the charging apparatus 10. The charging apparatus 10 then exits the non-charging state 20 and enters the charging state 26 and charges that rechargeable apparatus 100. This disables (switches-off) the indication 17. In some but not necessarily all examples, apparatus 10 may exit the indication sub-state 24 when the rechargeable apparatus 100 associated with the indication is being charged other than by the charging apparatus 10. The charging apparatus 10 then exits the indication sub-state 24 and re-enters the no-indication sub-state 22. This disables (switches-off) the indication 17. The charging apparatus 10 remains in the non-charging state 20.

In some but not necessarily all examples, the rechargeable apparatus 100 associated with the indication 17 can transmit a reset radio signal to the charging apparatus 10. The charging apparatus 10, in response to receiving the reset radio signal, exits the indication sub-state 24 and enters the no-indication sub-state 22. The indication 17 associated with the rechargeable apparatus 100 that sent the reset radio signal is disabled (switched-off).

The trigger at the rechargeable apparatus 100 for sending the reset radio signal may be that the mandatory condition(s) of a trigger event are no longer satisfied. This may, for example, be because the rechargeable apparatus 100 is being charged (but not by the charging apparatus 10) or because the charging level of the rechargeable apparatus 100 has increased.

As an alternative, apparatus 10 may be configured to automatically exit the indication sub-state 24 and re-enter no-indication sub-state 22 unless a trigger radio signal 21 is received within a threshold time after receiving the last trigger radio signal 21. The threshold time may be programmable via the rechargeable apparatus 100. In this example, the rechargeable apparatus 100 may be configured to periodically retransmit the trigger radio signal 21 while the mandatory condition(s) of a trigger event are satisfied. The period of retransmission is less than the threshold time.

FIG. 9A illustrates a system comprising the charging apparatus 10 and one or more rechargeable apparatus 100. In this example, when the charging level of the rechargeable apparatus 100 drops to 15%, the rechargeable apparatus 100 transmits a trigger radio signal 21 to the charging apparatus 10. The charging apparatus 10 responds by producing a colored glow as indication 17. The colored glow 17 invites the user to move the rechargeable apparatus 100 and place it on a charging mat 90 of the charging apparatus 10, as illustrated in FIG. 9B. This brings the rechargeable apparatus 100 within the charging range of the charging apparatus 10 and automatically initiates inductive charging of the rechargeable apparatus 100.

FIG. 10 illustrates an example of a rechargeable apparatus 100.

In this example, but not necessarily all examples, control circuitry comprises a processor 106 and a memory 102. However, implementation of the control circuitry can be in hardware alone (a circuit, a processor) have certain aspects in software including firmware alone or can be a combination of hardware and software (including firmware).

The control circuitry may be implemented using instructions that enable hardware functionality, for example, by using executable computer program instructions in a general-purpose or special-purpose processor that may be stored on a computer readable storage medium (disk, memory etc) to be executed by such a processor.

In FIG. 10, the processor 106 is configured to read from and write to the memory 102. The processor 106 may also comprise an output interface via which data and/or commands are output by the processor 106 and an input interface via which data and/or commands are input to the processor 106.

The memory 102 stores a computer program 104 comprising computer program instructions (computer program code) that controls the operation of the apparatus 100 when loaded into the processor 106. The computer program instructions, of the computer program 104, provide the logic and routines that enables the apparatus to perform the methods illustrated in the other Figs. The processor 106 by reading the memory 102 is able to load and execute the computer program 104.

The computer program 104 may arrive at the apparatus 100 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 104. The delivery mechanism may be a signal configured to reliably transfer the computer program 104. The apparatus 100 may propagate or transmit the computer program 104 as a computer data signal.

Although the memory 102 is illustrated as a single component it may be implemented as one or more separate components some or all of which may be integrated/removable and/or may provide permanent/semi-permanent/dynamic/cached storage.

Although the processor 106 is illustrated as a single component it may be implemented as one or more separate components some or all of which may be integrated/removable.

The rechargeable apparatus 100 additionally comprises user input/output circuitry 108. The processor 106 is configured to provide output signals to the input/output circuitry 108 and is configured to receive input signals from the input/output circuitry 108. The input/output circuitry may comprise circuitry that combines input and output such as, for example, a touch sensitive display and/or may comprise circuitry that provides only input such as, for example, keys or switches or a microphone or a vibration alert and/or may comprise circuitry that provides only output such as, for example, a display or an audio output port e.g. a loudspeaker.

The rechargeable apparatus 100 additionally comprises charging circuitry 35 and an energy store 38. In some but not necessarily all examples, these may be, for example, as described in relation to FIG. 3.

The rechargeable apparatus 100 may additionally comprise communication circuitry 110 for sending a trigger signal 21, directly or indirectly, to the communication circuitry 60 of the apparatus 10.

In the illustrated example, but not necessarily all examples, the communication circuitry 110 is configured to transmit a wireless trigger signal 21 as far-field, radiating radio waves. For example, the communication circuitry 110 may be configured to transmit the trigger signal 21 as radio signals in one or more of the unlicensed Industrial Scientific Medical (ISM) bands, for example as radio signal at an operational frequency between 2400 MHz and 2500 MHz. The communication circuitry 110 may in some but not necessarily all examples comprise a Bluetooth® low-energy transceiver. In some, but not necessarily all examples, the communication circuitry 110 is configured to communicate over a communication range that is greater than 0.5 meters and less than 10 m or 100 m. The communication circuitry 110 is therefore able to communicate over a distance greater than the charging range but which is still local to the charging apparatus 10.

The apparatus 100 therefore comprises: at least one processor 106; and at least one memory 104 including computer program code 104 the at least one memory 104 and the computer program code 104 configured to, with the at least one processor 106, cause the apparatus 100 at least to perform:
providing a user interface 120 configured to enable a user to define a trigger event 122 that causes, at a remote charging apparatus 10, an indication, when the charging apparatus 10 is in a non-charging state 20, to prompt action by a user of the rechargeable apparatus 100 to bring the rechargeable apparatus 100 towards the charging apparatus 10 for charging.

In some but not necessarily all examples, the indication 17 is provided in response to a wireless trigger signal 21 initiated by the communication circuitry 110 of the apparatus 100.

Figure 11:
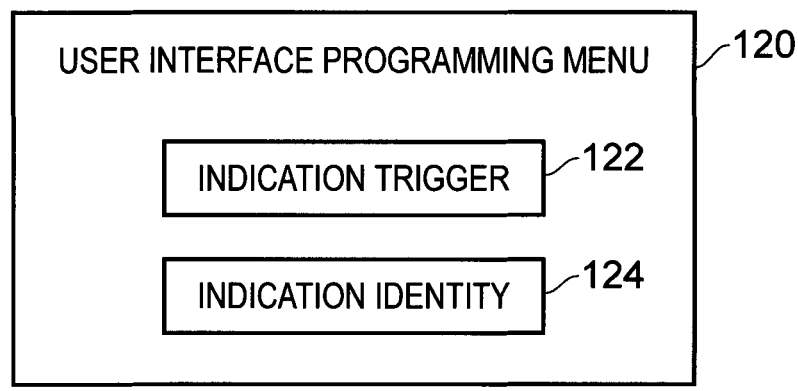
FIG. 11 illustrates an example of a user interface at the rechargeable apparatus.

FIG. 11 illustrates an example of a user interface 120 configured to enable a user of the rechargeable apparatus 100 to define a trigger event 122 that causes, at a remote charging apparatus 10, an indication 17, when the charging apparatus 10 is in a non-charging state 20. The indication 17 prompts action by a user of the rechargeable apparatus 100 to bring the rechargeable apparatus 100 towards the charging apparatus 10 for charging.

The trigger event 122 causes the rechargeable apparatus 100 to send a trigger radio signal 21, directly or indirectly, to the charging apparatus 10. The effect of the trigger radio signal 21 at the charging apparatus 10 has been previously described in the preceding paragraphs.

A trigger event 122 may be user-defined by specifying one or more mandatory conditions which must be satisfied before the trigger radio signal 21 is transmitted by the rechargeable apparatus 100. Examples of conditions comprise:
charging level of the rechargeable apparatus 100 and/or
location/proximity between the rechargeable apparatus 100 and the charging apparatus 10.

The user may specify via the user interface 120 a charging level of x %. A trigger event 122 occurs and the trigger radio signal 21 is transmitted by rechargeable apparatus 100 when the charging level of the rechargeable apparatus 100 falls beneath x %. The user may specify x, for example, by inputting a value or selecting a value from a menu such as, for example, 15% or 25%.

The user may specify via the user interface 120 a location or a proximity to the charging apparatus 10. A trigger event 122 occurs and the trigger radio signal 21 is transmitted by rechargeable apparatus 100 when the proximity of the rechargeable apparatus 100 to the charging apparatus 10 falls beneath a user specified value. The user may specify the value by, for example, inputting a value or selecting a value from a menu. The value may be selected so that the trigger event 122 only occurs when the rechargeable apparatus 100 is local to the charging apparatus 10, for example, within 5 meters of the charging apparatus 10, although other values are possible.

The trigger event 122 may occur whenever: the charging condition is satisfied.

Alternatively, the trigger event 122 may occur whenever: the proximity condition is satisfied.

Alternatively, the trigger event 122 may occur whenever: the charging condition is satisfied or the proximity condition is satisfied.

Alternatively, the trigger event 122 may occur whenever: both the charging condition is satisfied and the proximity condition are satisfied.

The identity or characteristics 124 of the indication 17 may additionally be programmed by a user of the rechargeable apparatus 100 via the user interface 120. The user may for example program the color(s), pattern, time-variation, spatial variation etc of the indication 17 produced at the charger apparatus 10 in response to the trigger radio signal 21. The trigger radio signal 21 itself may communicate information that defines the indication 17. Alternatively, the trigger radio signal 21 may communicate an identifier that is mapped at the charger apparatus 10 to a particular indication 17.

The rechargeable apparatus 100 may be configured to synchronise an additional indication provided by the user input/output circuitry 108 of the rechargeable apparatus 100 with the indication 17 at the charging apparatus 10. The additional indication may, for example, comprise a visual indication and/or a vibration alert and/or an audio alert.

The rechargeable apparatus 100 may be hand-portable, that is, of a size and mass that can be supported, in use, by a human hand. Some hand-portable apparatus may be sized to fit with an inside jacket pocket, others may be slightly larger.

The rechargeable apparatus 100 may be a personal user apparatus or an accessory for a personal user apparatus. A personal user apparatus is an apparatus that has a primary user and stores personal information relating to that primary user. A personal user apparatus with often stay among the primary user's personal possessions throughout the day and it is likely to be carried by the primary user when they leave their home.

The rechargeable apparatus 100 may be a cellular radio communications terminal, for example, it may be user equipment in a Public land Mobile Network (PLMN).

The blocks illustrated in the FIGS. 7A, 7B, 8A, 8B may represent steps in a method and/or sections of code in the computer program 64. The illustration of a particular order to the blocks does not necessarily imply that there is a required or preferred order for the blocks and the order and arrangement of the block may be varied. Furthermore, it may be possible for some blocks to be omitted.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

As used here 'module' refers to a unit or apparatus that excludes certain parts/components that would be added by an end manufacturer or a user. Referring to FIG. 6, the control circuitry 12 may be a module, the charging circuitry 14 may be a module, the indication circuitry 16 may be a module and the communication circuitry 60 may be a module.

The term " operational frequency" is a frequency at which an antenna can efficiently operate. Efficient operation occurs, for example, when the antenna's insertion loss S11 is greater than an operational threshold such as 4 dB or 6 dB.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code;
wherein the at least one memory and the computer program code are configured to, with the at least one processor, cause the apparatus at least to perform:
accessing a trigger event comprising a battery level threshold of a rechargeable apparatus;
linking the rechargeable apparatus with a charging apparatus for wireless communication;
determining that the trigger event has occurred and the rechargeable apparatus is outside of a charging range of the charging apparatus;
in response to a determination that the trigger event has occurred and that the rechargeable apparatus is outside of the charging range of the charging apparatus, causing transmission of a wireless communication from the rechargeable apparatus to the charging apparatus;
causing an alert associated with the rechargeable apparatus to be provided by the charging apparatus; and
in an instance the rechargeable apparatus is positioned within the charging range of the charging apparatus, causing the provision of the alert associated with the rechargeable apparatus to be stopped.

2. An apparatus as claimed in claim 1, configured as a hand-portable apparatus.

3. An apparatus as claimed in claim 1, wherein the apparatus is further caused to provide for recharging of the rechargeable energy store while the apparatus including the rechargeable energy store is positioned upon a non-vehicular recharging mat of the remote recharging apparatus.

4. An apparatus as claimed in claim 1, wherein the user interface is configured to enable a user to define characteristics of the alert.

5. An apparatus as claimed in claim 4, wherein the user defined characteristics of the alert comprises one or more of at least one color, at least one visual alert, time-variation of at least one color and/or at least one visual alert, and spatial variation of at least one color and/or at least one visual alert.

6. An apparatus as claimed in claim 1, wherein the user interface is configured to enable a user to define one or more conditions that are satisfied to cause the trigger event.

7. An apparatus as claimed in claim 6, wherein the one or more conditions comprises a charge level of the apparatus.

8. An apparatus as claimed in claim 6, wherein the one or more conditions comprises a proximity condition defining proximity between the apparatus and the charging apparatus.

9. A method comprising:
accessing a trigger event comprising a battery level threshold of a rechargeable apparatus;
linking the rechargeable apparatus with a charging apparatus for wireless communication;
determining that the trigger event has occurred and the rechargeable apparatus is outside of a charging range of the charging apparatus;
in response to a determination that the trigger event has occurred and that the rechargeable apparatus is outside of the charging range of the charging apparatus, causing transmission of a wireless communication from the rechargeable apparatus to the charging apparatus;
causing an alert associated with the rechargeable apparatus to be provided by the charging apparatus; and in an instance the rechargeable apparatus is positioned within the charging range of the charging apparatus, causing the provision of the alert associated with the rechargeable apparatus to be stopped.

10. A method as claimed in claim 9, wherein the user interface is configured to enable a user to define characteristics of the indication.

11. A method as claimed in claim 9, wherein the method is implemented using a hand-portable apparatus.

12. A method as claimed in claim 9, further comprising recharging of the rechargeable energy store while the apparatus including the rechargeable energy store is positioned upon a non-vehicular recharging mat of the remote recharging apparatus.

13. The method of claim 9, wherein the alert associated with the rechargeable apparatus is provided by both the rechargeable apparatus and the charging apparatus.

14. A method as claimed in claim 9, wherein causing the transmission of a wireless communication from the rechargeable apparatus to the charging apparatus comprises transmitting the wireless communication via an intermediary apparatus communicatively connected to the rechargeable apparatus and the charging apparatus.

15. A method as claimed in claim 9, wherein the user interface is configured to enable a user to define one or more conditions that are satisfied to cause the trigger event.

16. A method as claimed in claim 15, wherein the one or more conditions comprises a charge level of the apparatus.

17. A method as claimed in claim 15, wherein the one or more conditions comprises a proximity condition defining proximity between the apparatus and the charging apparatus.

18. A non-transitory computer readable medium comprising computer program, which, when executed on a processor of an apparatus, causes the apparatus to at least perform:

accessing a trigger event comprising a battery level threshold of the rechargeable apparatus;

linking the rechargeable apparatus with a charging apparatus for wireless communication;

determining that the trigger event has occurred and the rechargeable apparatus is outside of a charging range of the charging apparatus;

in response to a determination that the trigger event has occurred and that the rechargeable apparatus is outside of the charging range of the charging apparatus, causing transmission of a wireless communication from the rechargeable apparatus to the charging apparatus;

causing an alert associated with the rechargeable apparatus to be provided by the charging apparatus; and in an instance the rechargeable apparatus is positioned within the charging range of the charging apparatus, causing the provision of the indicated alert associated with the rechargeable apparatus to be stopped.

19. A non-transitory computer readable medium as claimed in claim 18, wherein the user interface is configured to enable a user to define one or more conditions that are satisfied to cause the trigger event, and wherein the one or more conditions comprises a charge level of the apparatus or a proximity condition defining proximity between the apparatus and the charging apparatus.

20. A non-transitory computer readable medium as claimed in claim 18, wherein the apparatus is further caused to provide for recharging of the rechargeable energy store while the apparatus including the rechargeable energy store is positioned upon a non-vehicular recharging mat of the remote recharging apparatus.

\* \* \* \* \*